US005242496A

United States Patent [19]

Handy

[11] Patent Number: 5,242,496

[45] Date of Patent: Sep. 7, 1993

[54] SPINNING PLATEN PAINT SET

[75] Inventor: John N. Handy, Long Beach, Calif.

[73] Assignee: Mattel, Inc., El Segundo, Calif.

[21] Appl. No.: 832,535

[22] Filed: Feb. 7, 1992

[51] Int. Cl.[5] ........................ B05B 13/02; G09B 11/10

[52] U.S. Cl. ........................................ 118/52; 434/84; 118/320

[58] Field of Search ............................ 434/84, 81, 103; 446/146, 236; 118/52, 320

[56] References Cited

U.S. PATENT DOCUMENTS

| | | | |
|---|---|---|---|
| 2,875,553 | 3/1959 | Morgan | 446/22 |
| 3,280,792 | 10/1966 | Heyde | 118/52 |
| 3,834,070 | 9/1974 | Breslow et al. | 446/146 |
| 4,496,510 | 1/1985 | Hanson et al. | 434/84 X |
| 4,550,679 | 11/1985 | Pipa et al. | 434/84 X |
| 4,735,306 | 4/1988 | Smit | 434/103 X |

OTHER PUBLICATIONS

JC Penney 1987 Catalog, p. 425 "Swirl Art".

*Primary Examiner*—Mickey Yu
*Attorney, Agent, or Firm*—Roy A. Ekstrand

[57] ABSTRACT

A spinning platen paint set includes a support housing within which a platen is rotatably supported. A push rod operated drive mechanism is coupled to the rotatably supported platen to provide rapid spinning thereof. A curved shroud encloses a portion of the rotating platen while providing access to a paint medium supported upon the rotating platen. A paint mixing stand is supported by the housing within a recessed well and is configured to support a mixing bottle together with a plurality of bottle brush units in a manner permitting the transfer of the desired quantities of individual paints from the supported bottle brush units to the common mixing bottle.

5 Claims, 2 Drawing Sheets

SPINNING PLATEN PAINT SET

FIELD OF THE INVENTION

This invention relates generally to paint set type education and amusement devices and particularly to those utilizing a spinning or rotating platen.

BACKGROUND OF THE INVENTION

Through the years a great number of toys and amusement playsets have been created which are directed toward developing the artistic capabilities of young children while amusing and entertaining them. These artistic playsets have varied substantially from simple painting sets of brushes and various paints often accompanied by a painting easel or the like to more complex paint sets which provide assisting devices such as stencils or inking stamps and so on. Another type of painting activity playsets describes those commonly referred to as "finger painting" playsets in which a slow drying ink or paint is coated upon a working surface such as paper and manipulated by the child user's fingers and hands.

One of the more exciting type painting sets which has been developed in the art is often referred to as "spin-art". Spin-art relates to the achievement of color patterns upon a rapidly spinning or rotating paint medium. A common use for such spin-art has been found in decorating T-shirts or similar garments. Spin-art has particular appeal to the younger participants due to the ease with which the spin patterns may be obtained and the individual character obtained each time the spin-art is practiced.

One example of such spin-art type painting sets is found in a commercial product sold by the J.C. Penney Company under the trade name of swirl art in which the user applies paint to a spinning media such as paper or cards to achieve different swirl patterns.

U.S. Pat. No. 3,834,070 issued to Breslow, et al. sets forth a DOLL CARRYING A MARKING MEANS AND ACCESSORY WITH MOVABLE MARKING SURFACE in which a combination doll and accessory is provided having movable doll body portions and a movable arm connected thereto. The arm is adapted to hold a paintbrush or the like and the accessory set includes a platen on which paper or the like may be positioned to receive paint from the paintbrush. The platen is mounted on a base structure in front of the doll and a manually actuatable mechanism within the base structure is operatively connected to the mechanism operating the doll. A crank mechanism rotated by the user rotates the platen and simultaneously moves the doll's body and arm to carry the paintbrush alternately between the platen and a paint container positioned alongside the doll.

U.S. Pat. No. 2,875,553 issued to Morgan sets forth a COLOR CHANGING SPINNING TOY in which a rotatable member is coupled to a support frame within which a slidable push rod is supported. A ratcheting gear drive is coupled between the slidable push member and the rotatable platen to cause the platen to rotate as the push rod is rapidly moved back and forth within the frame. A one-way drive coupling mechanism permits the platen to continue freely rotating in the absence of push rod motion. A plurality of super-imposed rotatable elements preferably formed in thin disks display different colors and are differently arranged randomly as the platen rotates.

U.S. Pat. No. 4,496,510 issued to Hanson, et al. sets forth an ACTIVITY TOY which produces a needle craft-like texture design using plastic or amorphous solid substances. A screen is supported in a support housing and an extruder containing an amorphous substance is operated on the underside of the screen to force the material through the mesh spaces of the screen to create a needle craft-like textured design.

While the foregoing described prior art paint sets and similar apparatus have provided several interesting artistic activities, there remains a continuing need in the art for evermore entertaining, amusing and educational paint sets for use by child users.

SUMMARY OF THE INVENTION

Accordingly, it is a general object of the present invention to provide an improved paint set. It is a more particular object of the present invention to provide an improved spinning platen paint set. It is a still more particular object of the present invention to provide an improved spinning platen paint set which avoids undue messiness and which facilitates educational activity in connection with developing a child's understanding of color mixing and its various effects.

In accordance with the present invention, there is provided a spinning platen paint set for spin-painting a painting medium comprising: a housing; a platen rotatably supported upon the housing having means for receiving and supporting the painting medium; platen drive means for rotating the platen; and a paint mixing stand supported upon the housing for supporting a mixing container and a plurality of paint bottles in an inverted position such that paint may be transferred from selected ones of the paint bottles to the mixing container.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
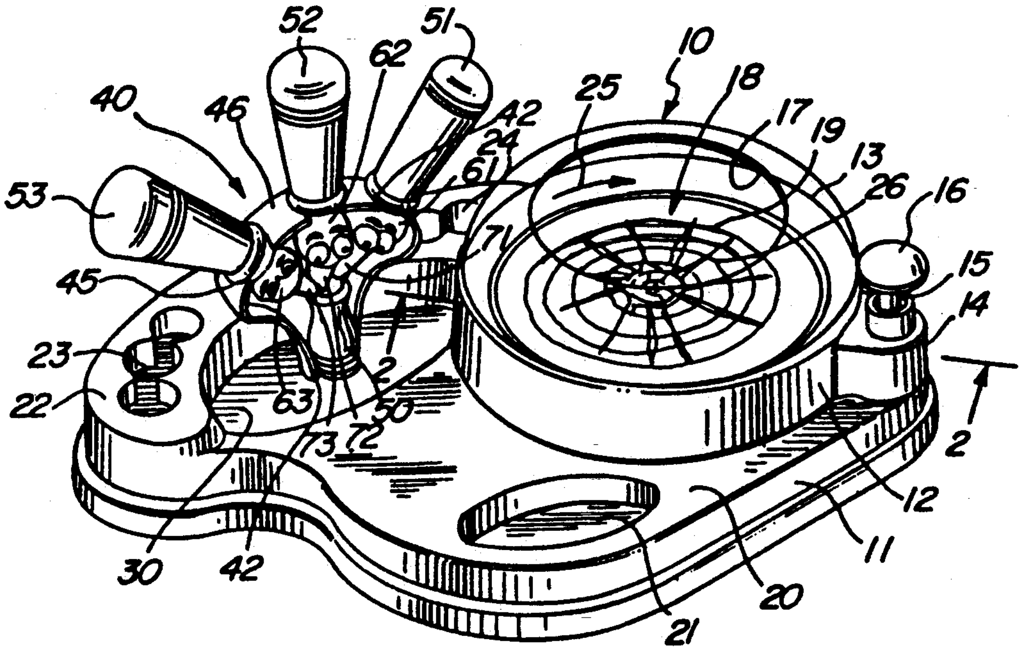
FIG. 1 sets forth a perspective view of a spinning platen paint set constructed in accordance with the present invention.

FIG. 1 sets forth a perspective view of a spinning platen paint set constructed in accordance with the present invention and generally referenced by numeral 10. Paint set 10 includes a generally planar housing 11 defining a generally cylindrical raised portion 12 and a push rod housing 14. Housing 11 further defines a generally planar upper surface 20 having a recess 21 and a well 30 formed therein. A supply stand 22 extends upwardly from upper surface 20 and partially encircles well 30 along the outer edge of housing 11. Supply stand 22 defines a plurality of interconnected recesses at one end thereof and a second plurality of interconnected recesses 24 at the opposing end thereof.

A paint mixing stand 40 defines a fan-shaped structure having a narrowed portion forming a bottle retainer 42 at the base thereof and a generally curved outer surface 46 on the upper edge thereof. Curved surface 46 defines a plurality of slots 43, 44 and 45 generally equally spaced along curved surface 46.

In accordance with the present invention, a paint bottle 50 is receivable within and supported by bottle retainer 42 of paint mixing stand 40. Bottle retainer 42 prevents bottle 50 from tipping over during the paint mixing operation. In accordance with the present invention, a plurality of paint bottles 51, 52 and 53 having respective paint brush head portions 61, 62 and 63 are received within slots 43 through 45 respectively. In accordance with an important aspect of the present invention, the curvature of curved surface 46 supports bottles 51 through 53 in a converging relationship such that bottle 50 may commonly receive the brush portions of brush heads 61 through 63.

Raised portion 12 supports a rotating platen 18 and a rotating drive operable thereon, the structure of which is better seen in FIGS. 2 through 4 below. Suffice it to note here, however, that rotating platen 18 supports a paint medium 19 which, in its preferred form, comprises a planar sheet of paper, cardboard or similar paint receiving material. A push rod 15 is movably supported within push rod housing 14 and defines an end knob 16. By means set forth below in greater detail, push rod 15 is operatively coupled to the rotating mechanism used to rotate platen 18 which, as mentioned, is better seen in FIGS. 2 through 4. However, suffice it to note here that the vertical movement of push rod 15 by properly timed downward force applied to knob 16 produces a rapid spinning or rotation of rotating platen 18 and paint receiving medium 19 in the direction indicated by arrow 25.

In accordance with the anticipated operation of paint set 10, the user initially places a sheet of paint medium upon rotating platen 18 in the manner shown for paint medium 19. Thereafter, with a receiving bottle such as bottle 50 positioned within bottle retainer 42, one or more bottle and brush units may then be positioned within slots 43 through 45 of paint mixing stand 40 in the manner shown. In the preferred form of the present invention, bottles 51 through 53 are fabricated of a resilient but somewhat flexible molded plastic material or the like which may readily be squeezed or deformed with moderate squeeze pressure. Also, in accordance with the preferred fabrication, head units 61 through 63 secured to bottles 51 through 53 respectively include paint communicating passages therethrough together with a plurality of paint brushes 71 through 73 respectively.

Thus, in the anticipated play pattern, the user is able to transfer a selected quantity of paint from one or all of bottles 51 through 53 by simply squeezing the desired bottle causing paint to be forced through the head structure and downwardly into bottle 50 through the bristle structure of the paint brush. In its preferred form, paint brushes 71 through 73 define one or more interior passages communicating with the interiors of their respective paint bottles. As will be apparent, the mixing process is greatly facilitated by the simultaneous access to three paint bottles supported by paint mixing stand 40. Once the desired colored combination is transferred to paint bottle 50, the user then is able to rapidly manipulate knob 16 to move push rod 15 and cause platen 18 and medium 19 to rotate or spin rapidly in the direction of arrow 25. Once platen 18 is rotating at the desired speed, the user may then pour or drip or otherwise transfer the paint contents from bottle 50 through opening 17 in shroud 13 to be received upon spinning paint medium 19. The spinning action forces the deposited paint to form a plurality of paint markings such as paint markings 26 upon paint medium 19. During this paint depositing or swirl painting process, the presence of curved shroud 13 prevents undesired spattering or paint scattering to surrounding objects near paint set 10. Thus, while curved shroud 13 protects against undesired paint spattering, opening 17 is sufficiently large to provide ample access to medium 19 for the swirl painting process.

It will be apparent to those skilled in the art that a brush head such as head 61 having a brush such as 71 may be secured to bottle 50 permitting bottle 50 to be inverted and used to paint directly upon rotating paint medium 19 rather than dripping or pouring the paint as described above. In addition, it will be equally apparent to those skilled in the art that any or all of bottles 51 through 53 may also be used directly to deposit or paint upon paint medium 19.

During the paint mixing process, bottle retainer 42 tends to maintain bottle 50 securely and therefore tends to prevent bottle 50 from being tipped over producing undesired paint spills. In addition, the presence of recessed well 30 about paint mixing stand 40 provides a further precaution against undesired paint spilling in that inadvertently spilled paint is retained within well 30 and thus does not flow outwardly from paint set 10 to damage surrounding surfaces or objects.

Recesses 23 and 24 are configured to receive objects convenient to be retained during the painting process. Thus, it is anticipated that additional bottles such as bottles 51 through 53 may be used in combination with the present invention paint set and may be securely held within recesses 23 and 24. In accordance with a further advantage of the present invention, curved shroud 13 is removable from raised portion 12 to facilitate easy cleaning thereof and to provide easy access to paint medium 19 thereby permitting the medium to changed easily.

Figure 2:
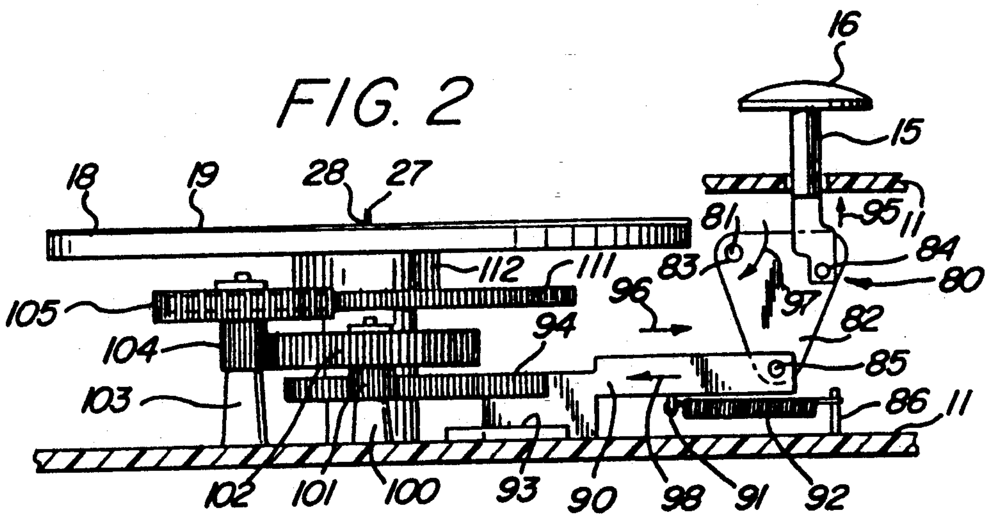
FIG. 2 sets forth a partial section view of a portion of the present invention spinning platen paint set taken along section lines 2—2 in FIG. 1.

FIG. 2 sets forth a section view of a portion of paint set 10 taken along section lines 2—2 in FIG. 1. Housing 11 supports a generally cylindrical upwardly extending platen support 110. Housing 11 further defines a guide channel 93 and an upwardly extending post 86. A triangular link 82 is pivotally supported within housing 11 to form a pivot drive mechanism generally referenced by numeral 80. Triangular link 82 defines an aperture 83 which receives a pivot pin 81. In accordance with conventional fabrication techniques not shown, pin 81 is maintained in a stationary position by its attachment to the interior of housing 11. Suffice it to note here that pin 81 is fixed and thus permits triangular link 82 to pivot in either direction about pin 81 due to the loose fit of aperture 83 thereon. Push rod 15 supports a knob 16 and extends downwardly into housing 11 and is pivotally coupled to triangular link 82 by a pivot pin 84.

An elongated drive arm 80 is pivotally coupled to the lower apex of triangular link 82 by a pin 85 and is slidably movable upon the interior surface of housing 11. Housing 11 defines a guide channel 93 which receives a portion of drive arm 90 to maintain a straight line travel path for arm 90. Drive arm 90 further includes a downwardly extending spring clip 91 while a coil spring 92 is coupled between spring clip 91 and post 86 of housing 11. Spring 92 is a conventional coil spring operative to urge spring clip 91 and drive arm 90 toward post 86. Drive arm 90 further includes a linear gear rack 94. A support post 100 extends upwardly from the lower surface of housing 11 and receives a compound formed by gear segments 101 and 102. In their preferred form, gear segments 101 and 102 are integrally molded in a common unit and are rotatable upon support post 100. Support post 100 is positioned so as to maintain gear 101 in direct engagement with gear rack 94. A second support post 103 rotatably supports a second compound gear having gear segments 104 and 105. Once again, in its preferred form, the compound gear formed by gear segments 104 and 105 is formed as an integrally molded common unit. Support post 103 is positioned so as to cause gear 104 to engage gear 102. A platen support 110 extends upwardly from the housing 11 and supports a platen gear 111 in a rotatable support. Platen support 110 is positioned to provide direct engagement between platen gear 111 and gear 105. A one-way drive coupling mechanism constructed in accordance with conventional fabrication techniques is coupled between platen gear 11 and a rotatable platen 18. Platen 18 defines a center post 27 and a medium support surface 113. A painting medium 19, preferably formed of a paint absorbing paper or cardboard, defines a center aperture 28 received upon center post 27 of platen 18 and rests upon surface 113. For purposes of illustration, the remaining portion of housing 11, raised portion 12 and curved shroud 13 have been omitted from the section view of FIG. 2 to better facilitate the examination of the platen drive mechanism.

In operation, the spring force provided by spring 92 urges drive arm 90 in the direction indicated by arrow 96 which in turn urges triangular link 82 in a counterclockwise pivotal direction causing push rod 15 to be raised upwardly with respect to push rod housing 14 in the direction indicated by arrow 95. The rotation of platen 18 described above is obtained by the action of the user in rapidly pushing knob 16 downwardly against push rod housing 14 thereby driving push rod 15 downwardly against pin 84 of triangular link 82. The downward force upon pin 84 causes triangular link 82 to be pivoted in the direction indicated by arrow 97 which in turn forces drive arm 90 in the direction indicated by arrow 98. So long as the downward force upon knob 16 is sufficient to overcome the spring force of spring 92, drive arm 90 is caused to move in the direction of arrow 98. The movement of drive arm 90 moves gear rack 94 correspondingly which in turn rotates gears 101 and 102. The rotation of gear 102 in turn causes a corresponding rotation of gears 104 and 105. The rotation of gear 105 causes a corresponding rotation of platen gear 111. As platen gear 111 is rotated, one way drive mechanism 112 is operative in accordance with conventional fabrication techniques to engage platen 18 and operatively couple the rotational force applied to platen gear 111 to platen 18 thereby causing platen 18 to rotate.

Figure 3:
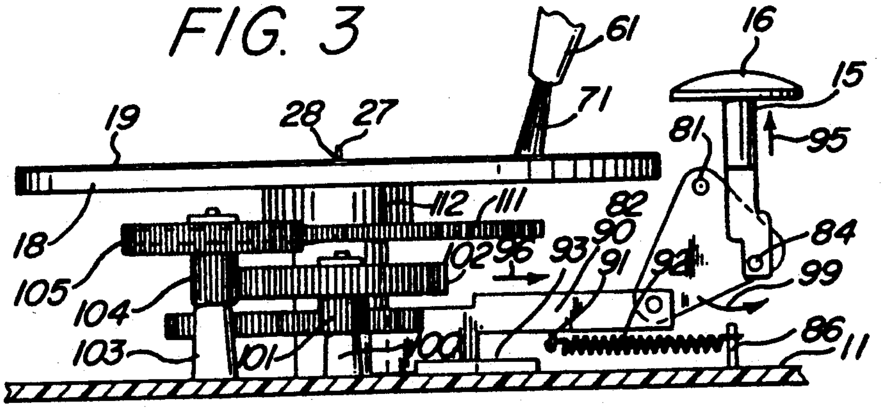
FIG. 3 sets forth a section view of the present invention spinning platen paint set also taken along section lines 2—2 in FIG. 1 showing the operation of the platen spinning mechanism.

FIG. 3 sets forth the relative position of the platen drive mechanism shown in FIG. 2 once knob 16 and push rod 15 have been driven fully into push rod housing 14. Thus, FIG. 3 shows the platen drive mechanism at the end of a downward stroke of push rod 15. Once the maximum downward stroke has been obtained, the user releases knob 16. With the removal of downward force upon knob 16, the return spring force provided by spring 92 drives arm 90 in the direction indicated by arrow 96 which in turn pivots triangular link 82 about pin 81 in the counterclockwise direction indicated by arrow 99. With the counterclockwise pivotal motion of triangular link 82, push rod 15 is driven upwardly in the direction indicated by arrow 95. This return process continues under the urging of spring 92 until the operative mechanism has returned to the position shown in FIG. 2.

During the return cycle of the platen drive mechanism shown in FIG. 3, the rotation of gears 101 through 105 is reversed due to the movement of gear rack 94 in the reversed direction indicated by arrow 96. This reverse motion causes a corresponding reverse motion of platen gear 111. In accordance with the one-way drive characteristic of drive 112, the coupling between platen gear 111 and platen 18 is interrupted permitting platen 18 to freely rotate and continues its rotation during the above-described return cycle of the drive mechanism.

Once the drive mechanism has returned to the position shown in FIG. 2 and as platen 18 continues to rotate, additional energy may be imparted to the rotation of platen 18 by once again forcing knob 16 and push rod 15 downwardly in the manner described above to produce an additional drive stroke for the platen drive system. This process continues so long as it is desired to rotate platen 18.

Figure 4:
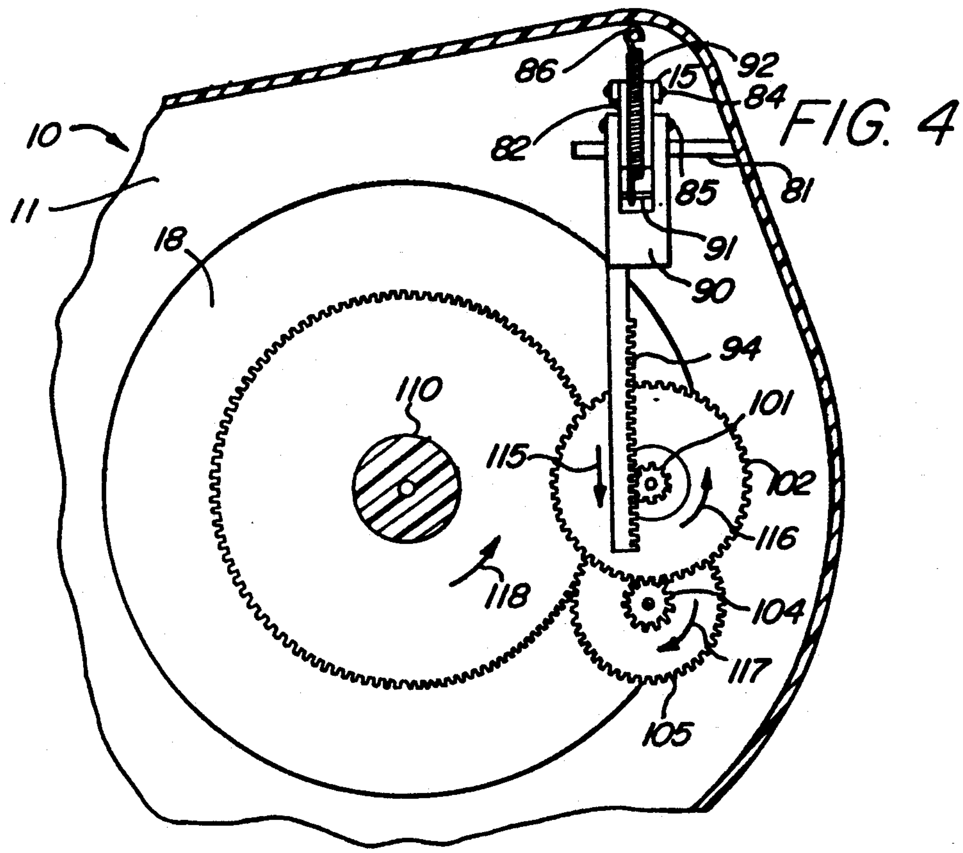
FIG. 4 sets forth a partially sectioned bottom view of a portion of the present invention spinning platen paint set.

FIG. 4 sets forth a partial section bottom view of the present invention paint set. Paint set 10 includes a housing 11 which defines a stationary support pin 81. A triangular link 82 is received upon pin 81 in a pivotal attachment as set forth above. A push rod 15 is coupled to triangular link 82 by a pin 84 while an elongated drive arm 90 is coupled to triangular link 82 by a pin 85. Drive arm 90 further defines a spring clip 91 and a linear gear rack 94. Housing 11 further defines a spring post 86. A coil return spring 92 is coupled between post 86 and spring clip 91 and is operative to urge drive arm 90 toward post 86. A gear 101 is integrally formed with a gear 102 and engages gear rack 94. A gear 104 engages gear 102 and is integrally formed with a gear 105. A platen gear 111 is rotatably supported by a platen support 110 and engages gear 105. Platen 18 is coupled to platen gear 111 by a one way drive coupling 112 (seen in FIG. 2).

In operation, FIG. 4 shows the relative positions of drive components corresponding to FIG. 2 set forth above. As described in conjunction with FIGS. 2 and 3 above, platen rotation is provided by the user applying a downward force upon push rod 15 which rotates triangular link 82 about pin 81 causing drive arm 90 to move gear rack 94 in the direction indicated by arrow 115. The motion of gear rack 94 causes a corresponding rotation of gears 101 and 102 in the direction indicated by arrow 116 which in turn rotates gears 104 and 105 in the direction indicated by arrow 117. The rotation of gear 105 in turn rotates platen gear 111 in the direction indicated by arrow 118.

Figure 5:
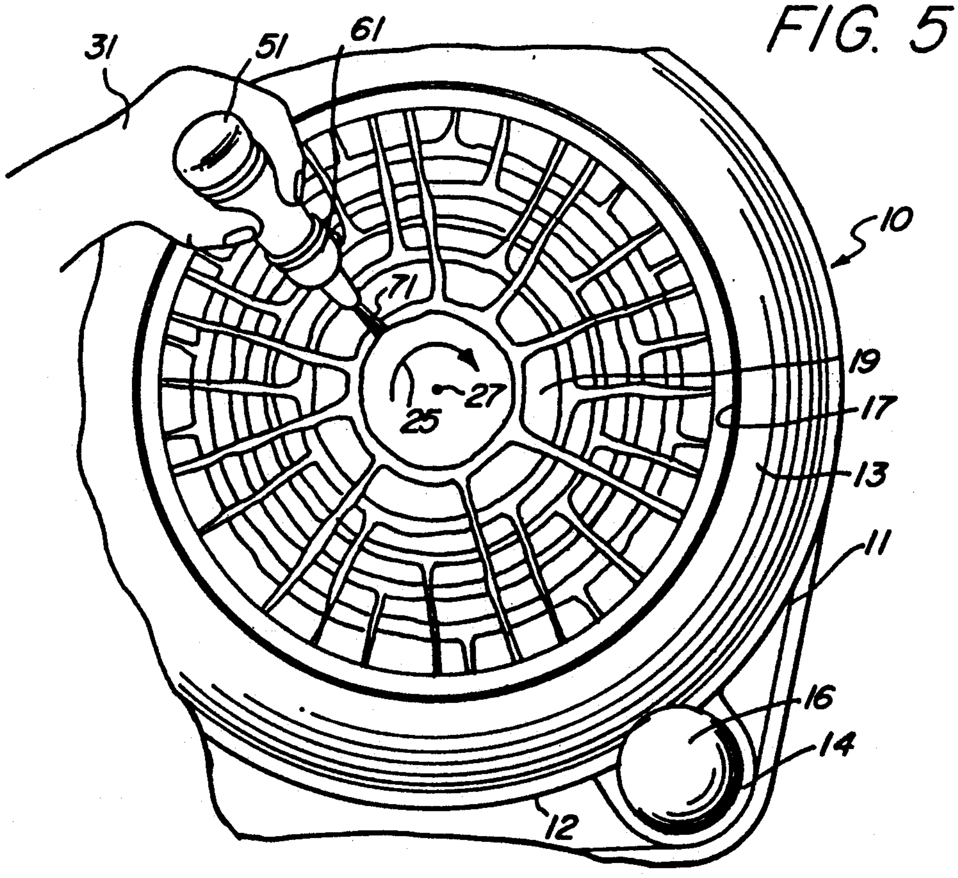
FIG. 5 sets forth a top view of a portion of the present invention spinning platen paint set during a typical painting operation.

FIG. 5 sets forth a partial top view of paint set 10 showing a typical user application of paint to the rotating medium to produce the desired swirl painting action. As described above, paint set 10 includes a housing 11 having a generally cylindrical raised portion 12 and a curved shroud 13 supported thereby. Curved shroud 13 further defines an enlarged opening 17. Housing 11 further defines a push rod housing 14 which supports a push rod 15 (seen in FIG. 1) together with knob 16. A rotatable platen is supported within raised portion 12 and rotatably driven in the manner described above. As is also described above, rotatable platen 18 (seen in FIG. 2) defines a center post 27 and receives a paint medium 19. As platen 18 and paint medium 19 are rotated in the direction indicated by arrow 25, a user having a hand 31 grasps a selected one of the paint bottle brush units such as bottle 51 in an inverted grip such that head 61 and brush 71 extend downwardly through opening 17 of curved shroud 13. The bottle brush assembly is lowered until brush 71 contacts spinning paint medium 19 to produce the desired paint pattern upon medium 19. Medium 19 is shown in FIG. 5 to define a plurality of circular image objects generally concentric with center post 27 together with a plurality of spoke-like radially extending elements. Generally speaking, the circular image elements are formed by direct contact of brush 71 or other brushes with medium 19 while the radially extending portions of the painted image or formed due to the centrifugal force which is imparted to the paint upon medium 19 due to the rapid spinning thereof. It will be apparent to those skilled in the art that the pattern shown in FIG. 5 is merely for purposes of illustration and thus, a virtually endless variety of painting patterns may be created.

What has been shown is an improved spinning platen paint set in which a medium supporting platen is spun at a high speed of rotation while a quantity of paint is deposited upon the medium either by direct contact brushing or by being poured from a paint bottle to achieve the desired painting effect. A curved shroud supported upon the rotating platen provides protection against undesired paint spattering and splashing despite the high speed of platen rotation employed. A novel mixing stand facilitates the support of a plurality of paint bottle brush assemblies to provide easy color mixing for the user.

That which is claimed is:

1. A spinning platen paint set for spin-painting a painting medium, said paint set comprising:

a housing;

a platen rotatably supported upon said housing having means for receiving and supporting said painting medium;

platen drive means for rotating said platen;

a paint mixing stand supported upon said housing for supporting a mixing container and a plurality of paint bottles in an inverted position such that paint may be transferred from selected one of said paint bottles to said mixing container; and a curved shroud having an upper opening therein removably supported by said housing so as to encircle said platen.

2. A spinning platen paint set as set forth in claim 1 wherein said housing defines a generally planar portion and a recessed well and wherein said paint mixing stand is supported within said well.

3. A spinning platen paint set as set forth in claim 2 wherein said platen drive means include a push rod extending through said housing.

4. A spinning platen paint set as set forth in claim 3 wherein said platen drive means include a linear motion gear rack coupled to said push rod by a pivoting link and a speed multiplying gear set coupled between said gear rack and said platen.

5. A spinning platen paint set as set forth in claim 4 wherein said platen drive means include a single direction drive coupling interposed between said speed multiplying gear set and said platen.

* * * * *